US011235637B1

(12) United States Patent
Goldenberg et al.

(10) Patent No.: US 11,235,637 B1
(45) Date of Patent: Feb. 1, 2022

(54) RECREATIONAL VEHICLE WITH UNDERBODY INSULATION

(71) Applicant: Grand Design RV, LLC, Middlebury, IN (US)

(72) Inventors: Nathan S Goldenberg, Granger, IN (US); Ryan B Getz, Goshen, IN (US)

(73) Assignee: Grand Design RV, LLC, Middlebury, IN (US)

( * ) Notice: Subject to any disclaimer, the term of this patent is extended or adjusted under 35 U.S.C. 154(b) by 131 days.

(21) Appl. No.: 16/454,539

(22) Filed: Jun. 27, 2019

Related U.S. Application Data

(60) Provisional application No. 62/691,253, filed on Jun. 28, 2018.

(51) Int. Cl.
| | |
|---|---|
| *B60H 1/00* | (2006.01) |
| *B60R 13/08* | (2006.01) |
| *B62D 21/03* | (2006.01) |
| *B60P 3/32* | (2006.01) |
| *B62D 25/20* | (2006.01) |
| *B60K 15/03* | (2006.01) |

(52) U.S. Cl.
CPC ......... *B60H 1/00564* (2013.01); *B60K 15/03* (2013.01); *B60P 3/32* (2013.01); *B60R 13/0815* (2013.01); *B62D 21/03* (2013.01); *B62D 25/20* (2013.01)

(58) Field of Classification Search
CPC ............ B60H 1/00364; B60H 1/00564; B60H 1/246; B60P 3/32; B62D 21/02; B62D 21/03; B62D 21/20; B62D 25/20
USPC .... 296/24.41, 39.3, 164, 168, 181.6, 193.07
See application file for complete search history.

(56) References Cited

U.S. PATENT DOCUMENTS

| | | | |
|---|---|---|---|
| 2,225,244 A | 12/1940 | Anderson | |
| 2,273,176 A * | 2/1942 | Fredc | B60H 1/00364 |
| | | | 126/11 OR |
| 2,417,463 A | 3/1947 | Anderson | |
| 2,483,721 A | 10/1949 | Becker | |
| 2,587,871 A | 3/1952 | May et al. | |
| 2,595,613 A | 5/1952 | Spencer | |
| 2,605,690 A | 8/1952 | Henney | |
| 2,668,666 A | 2/1954 | Anderson | |
| 2,756,000 A | 7/1956 | Anderson | |
| 2,760,726 A | 8/1956 | Parks et al. | |
| 2,982,580 A | 5/1961 | Lewis | |
| 2,985,375 A | 5/1961 | Gardner | |

(Continued)

OTHER PUBLICATIONS

KZ Spree Travel Trailer Brochure; located at https://www.kz-rv.com/brochures/2018/2018-KZ-RV-Spree-Luxury-Lightweight-Travel-Trailers-Brochure.pdf. (Year: 2017).*

*Primary Examiner* — Jason S Daniels
(74) *Attorney, Agent, or Firm* — Barnes & Thornburg LLP

(57) ABSTRACT

A recreational vehicle includes an interior space having a floor, a first insulating member located below the floor, a second insulating member located below the floor, a chassis located at least in part between the floor and the first insulating member and the floor and the second insulating member, a first enclosed volume defined by the floor, the chassis and the first insulating member, a second enclosed volume defined by the floor, the chassis and the second insulating member, an air flow path between the first enclosed volume and the second enclosed volume, and an air flow path between the interior of the recreational vehicle and the first enclosed volume.

21 Claims, 3 Drawing Sheets

(56) References Cited

U.S. PATENT DOCUMENTS

| | | | |
|---|---|---|---|
| 3,419,215 A | | 12/1968 | Riedel |
| 3,516,705 A | * | 6/1970 | Giessler .................... B60P 3/32 |
| | | | 296/168 |
| 3,565,480 A | | 2/1971 | McCollum et al. |
| 4,084,834 A | | 4/1978 | Becker |
| 4,653,729 A | | 3/1987 | Ando |
| 4,930,809 A | | 6/1990 | Lindsay |
| 5,054,843 A | | 10/1991 | Gray |
| 5,351,990 A | | 10/1994 | Thomas |
| 5,403,063 A | | 4/1995 | Sjostedt et al. |
| 5,772,276 A | | 6/1998 | Fetz et al. |
| 5,863,091 A | | 1/1999 | Shepherd et al. |
| 6,092,862 A | | 7/2000 | Kuwahara |
| 7,905,072 B2 | | 3/2011 | Verhaeghe |
| 8,662,405 B2 | | 3/2014 | Kloepfer |
| 8,796,588 B2 | | 8/2014 | Berger |
| 9,016,413 B2 | | 4/2015 | Ikeya |
| 9,555,688 B2 | | 1/2017 | Line et al. |
| 2002/0021024 A1 | * | 2/2002 | Crean ....................... B60P 3/34 |
| | | | 296/168 |
| 2007/0007794 A1 | * | 1/2007 | Bertoch ............... B62D 33/044 |
| | | | 296/168 |

\* cited by examiner

RECREATIONAL VEHICLE WITH UNDERBODY INSULATION

CROSS REFERENCE TO RELATED APPLICATION

This application claims priority from U.S. Provisional Patent Application No. 62/691,253, filed Jun. 28, 2018

BACKGROUND AND SUMMARY OF THE INVENTION

The present invention relates to a recreational vehicle with underbody insulation.

Various systems have been devised for heating recreational vehicles. Examples of such systems are disclosed in U.S. Pat. Nos. 2,225,244 and 2,760,726.

In one embodiment of the present invention, a recreational vehicle has a front end, a rear end, a first side extending from the front end to the rear end, a second side extending from the front end to the rear end opposite the first side, a chassis, and a floor located above the chassis. The chassis includes a first side frame member extending along the first side of the recreational vehicle from the front end to the rear end and a second side frame member extending along the second side of the recreational vehicle from the front end to the rear end. The first and second side frame members each have an upper surface and a lower surface. The chassis further includes a first cross member connected to the first side frame member and the second side frame member adjacent the front end of the recreational vehicle, a second cross member connected to the first side frame member and the second side frame member adjacent the rear end of the recreational vehicle, a third cross member connected to the first side frame member and the second side frame member between the first cross member and the second cross member, and a fourth cross member connected to the first side frame member and the second side frame member between the third cross member and the second cross member. The third and fourth cross members each have an upper surface, a lower surface, a front surface, a rear surface and an opening extending through the cross member from the front surface to the rear surface. The chassis further includes a first split cross member connected to the first side frame member and the second side frame member between the third cross member and the fourth cross member and a second split cross member connected to the first side frame member and the second side frame member between the first split cross member and the fourth cross member. The first and second split cross members each have an upper member and a lower member positioned below the upper member so as to form a space between the upper member and the lower member. The chassis further includes a first bracket connected to first side frame member, a second bracket connected to second side frame member, a third bracket connected to the third cross member, and a fourth bracket connected to the fourth cross member. A first insulating member is connected to the lower surface of the first side frame member, the second side frame member, the first cross member and the third cross member so as to form a first enclosed volume between the floor, the first insulating member, the first side frame member, the second side frame member, the first cross member and the third cross member. A second insulating member is connected to the first bracket, the second bracket, the third bracket and the fourth bracket so as to form a second enclosed volume between the floor, the second insulating member, the first side frame member, the second side frame member, the third cross member and the fourth cross member. A third insulating member is connected to the lower surface of the first side frame member, the second side frame member, the second cross member and the fourth cross member so as to form a third enclosed volume between the floor, the third insulating member, the first side frame member, the second side frame member, the second cross member and the fourth cross member.

In one embodiment, the second insulating member extends between the upper and lower members of the first and second split cross members. In another embodiment, the second insulating member is located above the lower surface of the first and second side frame members.

In one embodiment, the first and second brackets extend between the upper and lower members of the first and second split cross members. In certain embodiments, the first, second, third and fourth brackets each have an upper surface and the second insulating member is connected to the upper surface of the first, second, third and fourth brackets.

According to another embodiment, at least one fuel tank is located between the third and fourth cross members and below the second insulating member.

In one embodiment, the recreational vehicle includes an opening in the floor and a furnace for directing heated air through the opening and into one of the first, second and third enclosed volumes. In certain embodiments, the heated air flows between the first and second enclosed volumes through the opening in the third cross member and between the second and third enclosed volumes through the opening in the fourth cross member.

In one embodiment of the present invention, a recreational vehicle includes an interior defined at least in part by a floor, a ceiling and one or more walls, a furnace located in the interior, a first enclosed volume located below the floor, a second enclosed volume located below the floor, an opening in the floor through which heated air flows from the furnace to the first enclosed volume, and an air flow path from the first enclosed volume to the second enclosed volume.

In one embodiment, the recreational vehicle further includes a chassis having a first side frame member, a second side frame member, a first cross member, a second cross member, a third cross member, a first insulating member and a second insulating member. The first enclosed volume is defined by the floor, the first side frame member, the second side frame member, the first cross member, the second cross member and the first insulating member. The second enclosed volume is defined by the floor, the first side frame member, the second side frame member, the second cross member, the third cross member and the second insulating member.

In one embodiment includes at least one opening in the second cross member and the air flow path is defined at least in part by the opening in the second cross member.

In another embodiment, the second insulating member is located closer to the floor than is the first insulating member.

In certain embodiments, the recreational vehicle includes a third enclosed volume located below the floor and an air flow path from the second enclosed volume to the third enclosed volume.

In one embodiment, the chassis further includes a fourth cross member and a third insulating member. The third enclosed volume is defined by the floor, the first side frame member, the second side frame member, the third cross member, the fourth cross member and the third insulating member.

Another embodiment includes at least one opening in the third cross member and the air flow path from the second enclosed volume to the third enclosed volume is defined at least in part by the opening in the third cross member.

One embodiment includes a fuel tank located between the second and third cross members.

In one embodiment of the present invention, a recreational vehicle includes an interior space having a floor, a first insulating member located below the floor, a second insulating member located below the floor, a chassis located at least in part between the floor and the first insulating member and the floor and the second insulating member, a first enclosed volume defined by the floor, the chassis and the first insulating member, a second enclosed volume defined by the floor, the chassis and the second insulating member, an air flow path between the first enclosed volume and the second enclosed volume, and an air flow path between the interior of the recreational vehicle and the first enclosed volume.

In one embodiment, the air flow path between the interior of the recreational vehicle and the first enclosed volume includes an opening in the floor.

In another embodiment, the recreational vehicle includes a third insulating member, a third enclosed volume defined by the floor, the chassis and the third insulating member and an air flow path between the second enclosed volume and the third enclosed volume.

In one embodiment, the chassis includes a first cross member having an opening therein and the airflow path between the first enclosed volume and the second enclosed volume is defined at least in part by the opening in the first cross member.

In certain embodiments, the chassis includes a second cross member having an opening therein and the airflow path between the second enclosed volume and the third enclosed volume is defined at least in part by the opening in the second cross member.

Other embodiments include a fuel tank located between the first and second cross members.

DETAILED DESCRIPTION OF EMBODIMENTS OF THE INVENTION

Figure 1:
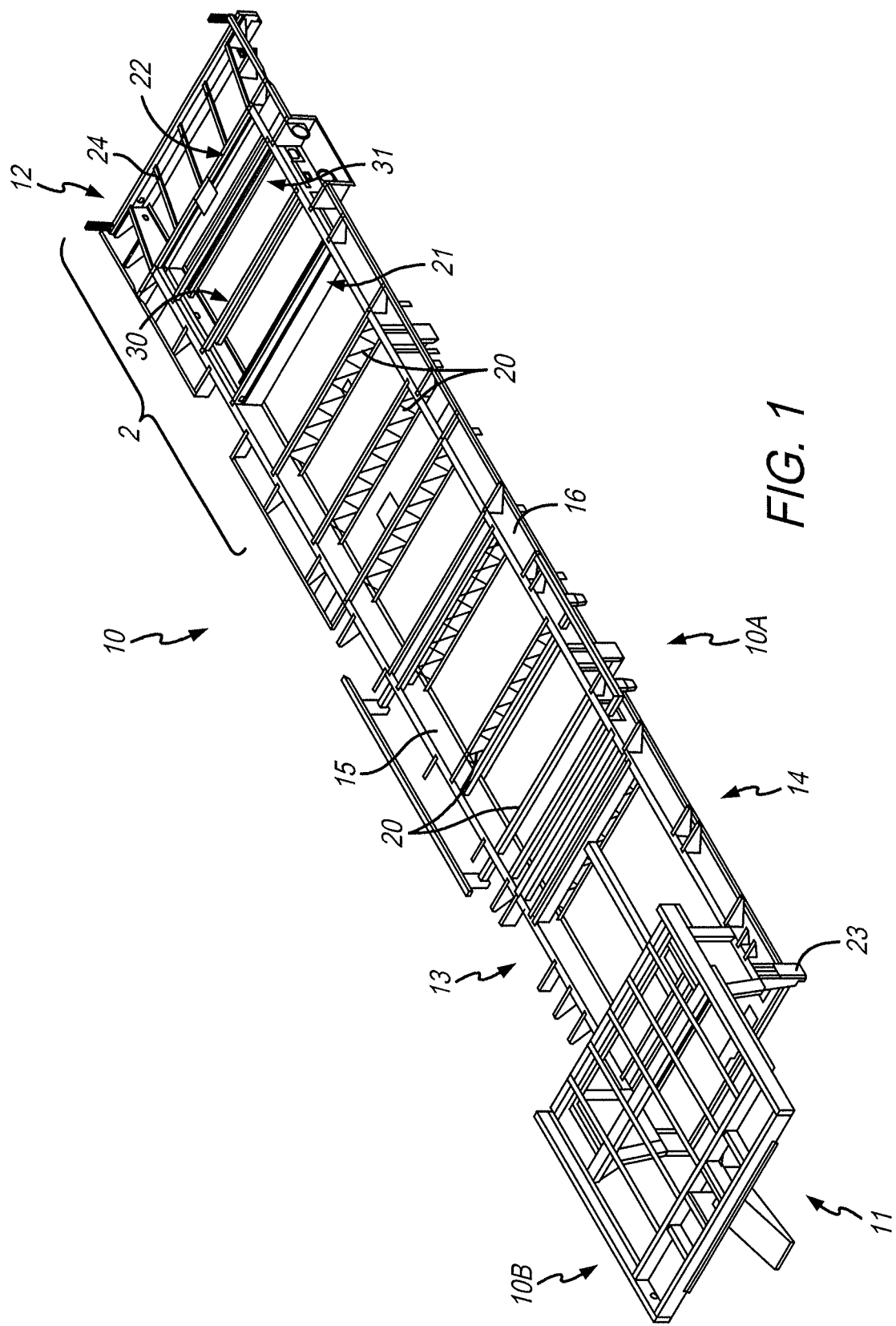
FIG. 1 is perspective view of a recreational vehicle chassis that is a component of a recreational vehicle according to one embodiment of the present invention.

FIG. 1 is perspective view of a recreational vehicle chassis 10 that is a component of a recreational vehicle according to one embodiment of the present invention. As shown in FIG. 1, chassis 10 has a lower section 10A, an upper section 10B, a front end 11, a rear end 12 a first or left side 13 and a second or right side 14. Chassis 10 includes a first side frame member or frame rail 15 extending along first side 13 and a second side frame member or frame rail 16 extending along second side 14. Chassis 10 further includes a plurality of cross members 20 extending between first side frame member 15 and second side frame member 16. Cross members 20 are connected to first side frame member 15 and second side frame member 16, such as by welding, and join first side frame member 15 and second side frame member 16 together. Cross members 20 also provide a support structure for a floor for a recreational vehicle as is known in the art.

Figure 2:
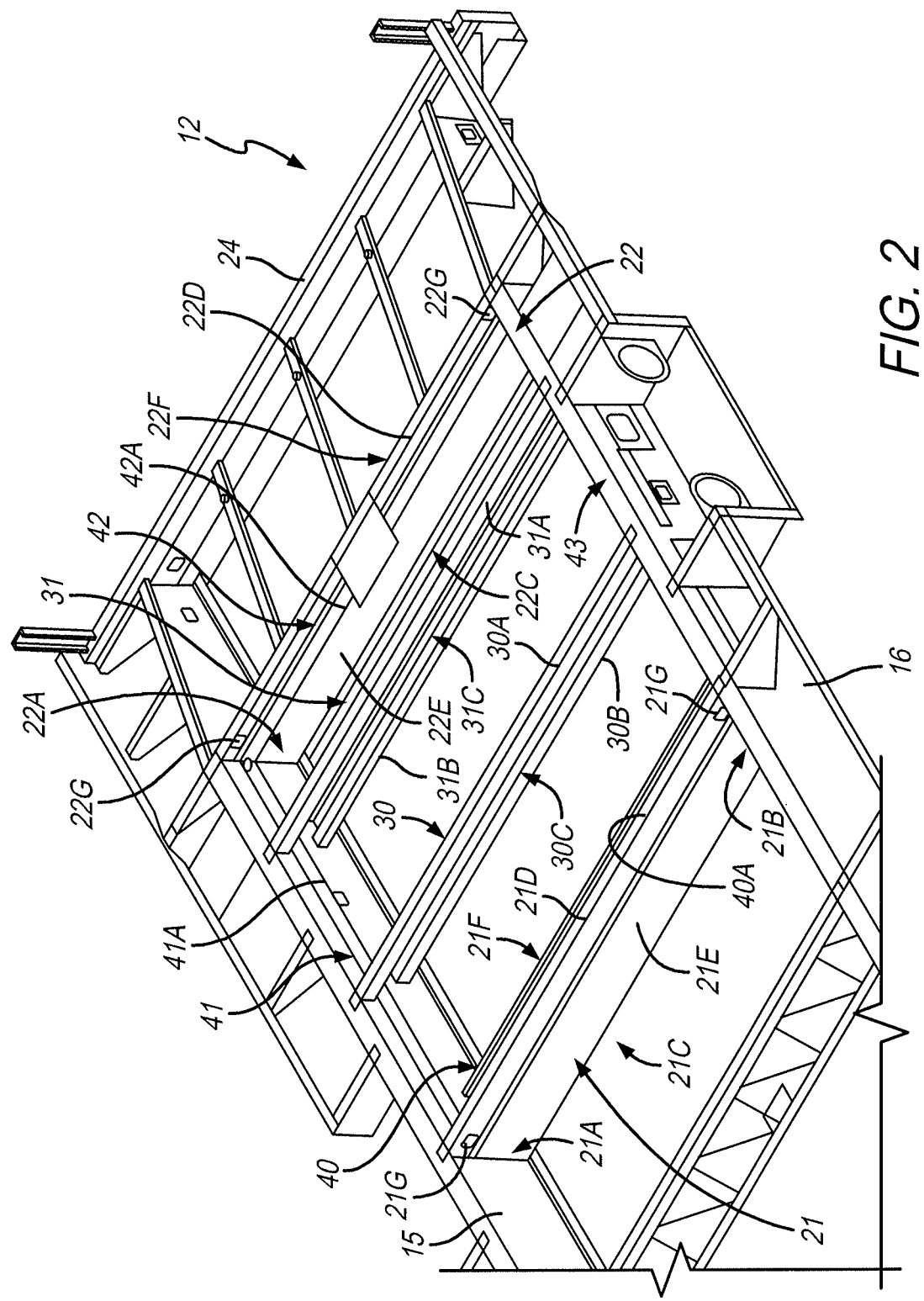
FIG. 2 is a detail view of area 2 in FIG. 1.

FIG. 2 is a detail view of area 2 in FIG. 1. As shown in FIG. 2, chassis 10 includes a first cross member 21 and a second cross member 22. First cross member 21 includes a first end 21A, a second end 21B, a lower surface 21C, an upper surface 21D, a front surface 21E and a rear surface 21F. First end 21A is connected to first side frame member 15 and second end 21B is connected to second side frame member 16. First cross member 21 includes one or more openings 21G extending through front surface 21E and rear surface 21F. In the embodiment shown, openings 21G are positioned in the upper region of first cross member 21 near upper surface 21D.

Second cross member 22 includes a first end 22A, a second end 22B, a lower surface 22C, an upper surface 22D, a front surface 22E and a rear surface 22F. First end 22A is connected to first side frame member 15 and second end 22B is connected to second side frame member 16. Second cross member 22 includes one or more openings 22G extending through front surface 22E and rear surface 22F. In the embodiment shown, openings 22G are positioned in the upper region of second cross member 22 near upper surface 22D.

As further shown in FIG. 2, chassis 10 further includes a first split cross member 30 and a second split cross member 31. First split cross member 30 includes a first or upper member 30A and a second or lower member 30B. Members 30A and 30B are connected at their ends to first side frame member 15 and second side frame member 16. Member 30A is positioned above member 30B so as to form a space 30C between first member 30A and second member 30B.

Second split cross member 31 includes a first or upper member 31A and a second or lower member 31B. Members 31A and 31B are connected at their ends to first side frame member 15 and second side frame member 16. Member 31A is positioned above member 31B so as to form a space 31C between first member 31A and second member 31B.

As also shown in FIG. 2, chassis 10 includes a first bracket 40, a second bracket 41, a third bracket 42 and a fourth bracket 43. First bracket 40 is connected to first cross member 21 and has an upwardly facing surface 40A. Second bracket 41 is connected to first side frame member 15 and has an upwardly facing surface 41A. Note that second bracket 41 is positioned so as to extend through spaces 30C and 31C such that there is a space between upwardly facing surface 41A and first member 30A and first member 31A of split cross members 30 and 31. Third bracket 43 is connected to second cross member 22 and has an upwardly facing surface 43A. Fourth bracket 44 is connected to second side frame member 16 and has an upwardly facing surface 44A. Note that fourth bracket 44 is positioned so as to extend through spaces 30C and 31C such that there is a space between upwardly facing surface 44A and first member 30A and first member 31A of split cross members 30 and 31. In the embodiment shown, brackets 40, 41, 42 and 43 are L-shaped members. However, other configurations of brackets 40, 41, 42 and 43 can be used.

Figure 3:
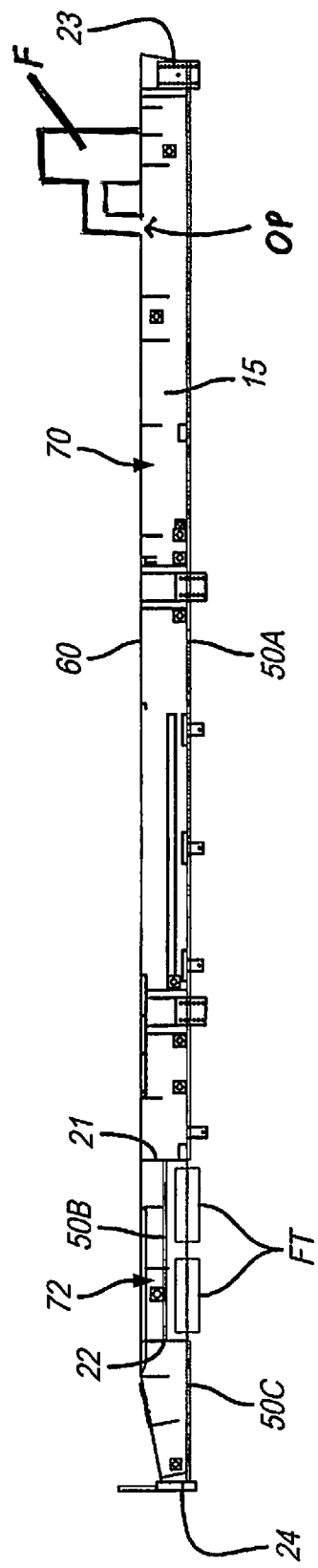
FIG. 3 is left side elevational view of a portion of the chassis shown in FIG. 1.

FIG. 3 is a left side elevational view of lower portion 10A of chassis 10. As shown in FIG. 3, insulating members 50A, 50B and 50C are secured to chassis 10. Insulating members 50A, 50B and 50C can be any of a number of commercially available underbody recreational vehicle insulating structures. For example, insulating members 50A, 50B and 50C can be rigid or semi-rigid insulating sheets. Other insulating materials can also be used.

In the embodiment show, first insulating member 50A is secured to the underside of first side frame member 15 and second side frame member 16 from one end of lower section 10A of chassis 10 to first cross member 21. First insulating member 50A is also connected to lower surface 21C of first cross member 21 and to the lower surface of a third cross member 23 at the front end of lower section 10A of chassis 10.

In the embodiment shown, second insulating member 50B is connected to upper surfaces 40A, 41A, 42A and 43A of brackets 40, 41, 42 and 43. Second insulating member 50B is positioned in spaces 30C and 31C of fist split cross member 30 and second split cross member 31. In this manner, fuel tanks FT or other structures can be located between first cross member 21 and second cross member 22 without interfering with the placement of second insulating member 50B.

In the embodiment show, third insulating member 50C is secured to the underside of first side frame member 15 and second side frame member 16 from second cross member 22 to second end 12 of chassis 10. Third insulating member 50C is also connected to lower surface 22C of second cross member 22 and to the lower surface of a fourth cross member 24 at second end 12 of chassis 10.

As further shown in FIG. 3, a floor 60 is secured to the upper surfaces of first side frame member 15, second side frame member 16 and the various cross member 20, 21, 22, 23 and 24. Floor 60 may also be connected to the upper surface of first member 30A of first split cross member 30 and to the upper surface of first member 31A of second split cross member 31. In this manner, floor 60, first insulating member 50A, first side frame member 15, second side frame member 16, first cross member 21 and third cross member 23 form a first enclosed volume 70. Similarly, floor 60, second insulating member 50B, first side frame member 15, second side frame member 16, first cross member 21 and second cross member 22 form a second enclosed volume 71. Likewise, floor 60, third insulating member 50C, first side frame member 15, second side frame member 16, second cross member 22 and fourth cross member 24 form a third enclosed volume 72.

In the embodiment shown, an opening OP may be cut in floor 60 above first enclosed volume 70 to direct heat from a furnace F or other heating system associated with the recreational vehicle into first enclosed volume 70. From first enclosed volume 70, heated air will flow through openings 21G in first cross member 21 and into second enclosed volume 71. Heated air will also flow from second enclosed volume 71 through openings 22G in second cross member 22 into third enclosed volume 72. In this manner, heated air is provided beneath the entire area of floor 60 from the front of lower section 10A to second end 12 of chassis 10, thereby warming the recreational vehicle throughout its length.

Although the present invention has been shown and described in detail the same is to be taken by way of example only and not by way of limitation. Numerous changes can be made to the embodiments described without departing from the scope of the invention.

What is claimed is:

1. A recreational vehicle having a front end, a rear end, a first side extending from the front end to the rear end, a second side extending from the front end to the rear end opposite the first side, a chassis, and a floor located above the chassis, the chassis including:

a first side frame member extending along the first side of the recreational vehicle from the front end to the rear end, the first side frame member having an upper surface and a lower surface;

a second side frame member extending along the second side of the recreational vehicle from the front end to the rear end, the second side frame member having an upper surface and a lower surface;

a first cross member;

a second cross member;

a third cross member connected to the first side frame member and the second side frame member adjacent the front end of the recreational vehicle;

a fourth cross member connected to the first side frame member and the second side frame member adjacent the rear end of the recreational vehicle;

the first cross member connected to the first side frame member and the second side frame member between the third cross member and the fourth cross member, the first cross member having a an upper surface, a lower surface, a front surface, a rear surface and an opening extending through the first cross member from the front surface to the rear surface;

the second cross member connected to the first side frame member and the second side frame member between the first cross member and the fourth cross member, the second cross member having a an upper surface, a lower surface, a front surface, a rear surface and an opening extending through the second cross member from the front surface to the rear surface;

a first split cross member connected to the first side frame member and the second side frame member between the first cross member and the second cross member, the first split cross member having an upper member and a lower member positioned below the upper member so as to form a space between the upper member and the lower member;

a second split cross member connected to the first side frame member and the second side frame member between the first split cross member and the second cross member, the second split cross member having an upper member and a lower member positioned below the upper member so as to form a space between the upper member and the lower member;

a first bracket connected to first side frame member;

a second bracket connected to second side frame member;

a third bracket connected to the first cross member;

a fourth bracket connected to the second cross member;

a first insulating member connected to the lower surface of the first side frame member, the second side frame member, the first cross member and the third cross member so as to form a first enclosed volume between the floor, the first insulating member, the first side frame member, the second side frame member, the first cross member and the third cross member;

a second insulating member connected to the first bracket, the second bracket, the third bracket and the fourth bracket so as to form a second enclosed volume between the floor, the second insulating member, the first side frame member, the second side frame member, the first cross member and the second cross member; and a third insulating member connected to the lower surface of the first side frame member, the second side frame member, the second cross member and the fourth cross member so as to form a third enclosed volume between the floor, the third insulating member, the first side frame member, the second side frame member, the second cross member and the fourth cross member.

2. The recreational vehicle according to claim 1, wherein the second insulating member extends between the upper and lower members of the first and second split cross members.

3. The recreational vehicle according to claim 1, wherein the first and second brackets extend between the upper and lower members of the first and second split cross members.

4. The recreational vehicle according to claim 1, wherein the second insulating member is located above the lower surface of the first and second side frame members.

5. The recreational vehicle according to claim 1, further including at least one fuel tank located between the first and second cross members and below the second insulating member.

6. The recreational vehicle according to claim 1, wherein the first, second, third and fourth brackets each have an upper surface and the second insulating member is connected to the upper surface of the first, second, third and fourth brackets.

7. The recreational vehicle according to claim 1, further including an opening in the floor and a furnace for directing heated air through the opening and into one of the first, second and third enclosed volumes.

8. The recreational vehicle according to claim 7, wherein the heated air flows between the first and second enclosed volumes through the opening in the first cross member and between the second and third enclosed volumes through the opening in the second cross member.

9. A recreational vehicle, including:
a chassis having a first side frame member having an upper surface and a lower surface, a second side frame member having an upper surface and a lower surface, a first cross member, a second cross member, and a third cross member;
a floor connected to the upper surface of the first side frame member and the upper surface of the second side frame member;
an interior defined at least in part by the floor, a ceiling and one or more walls;
a furnace located in the interior;
a first insulating member connected to the lower surface of the first side frame member and to the lower surface of the second side frame member;
a second insulating member located between the first side frame member, the second side frame member, the first cross member, and the second cross member and located above the lower surface of the first side frame member, above the lower surface of the second side frame member and below the floor;
a first enclosed volume located below the floor and defined by the floor, the first side frame member, the second side frame member, the first cross member, the third cross member and the first insulating member;
a second enclosed volume located below the floor and defined by the floor, the first side frame member, the second side frame member, the first cross member, the second cross member and the second insulating member;
a tank located below the second insulating member, the tank extending below the lower surface of the first side frame member and the lower surface of the second side frame member;
an opening in the floor through which heated air flows from the furnace to the first enclosed volume; and
an air flow path from the first enclosed volume to the second enclosed volume.

10. The recreational vehicle according to claim 9, further including at least one opening in the first cross member and wherein the air flow path is defined at least in part by the opening in the first cross member.

11. The recreational vehicle according to claim 9, wherein the second insulating member is located closer to the floor than is the first insulating member.

12. The recreational vehicle according to claim 9, further including a third enclosed volume located below the floor and an air flow path from the second enclosed volume to the third enclosed volume.

13. The recreational vehicle according to claim 12, wherein the chassis further includes a fourth cross member and a third insulating member and wherein the third enclosed volume is defined by the floor, the first side frame member, the second side frame member, the second cross member, the fourth cross member and the third insulating member.

14. The recreational vehicle according to claim 13, further including at least one opening in the second cross member and wherein the air flow path from the second enclosed volume to the third enclosed volume is defined at least in part by the opening in the second cross member.

15. The recreational vehicle according to claim 9, wherein the tank is located between the first and second cross members.

16. A recreational vehicle, including:
an interior space having a floor;
a first insulating member located below the floor;
a second insulating member located below the floor;
a chassis located at least in part between the floor and the first insulating member and the floor and the second insulating member;
a first enclosed volume defined by the floor, the chassis and the first insulating member;
a second enclosed volume defined by the floor, the chassis and the second insulating member;
an air flow path between the first enclosed volume and the second enclosed volume; and
an air flow path between the interior of the recreational vehicle and the first enclosed volume.

17. The recreational vehicle according to claim 16, wherein the air flow path between the interior of the recreational vehicle and the first enclosed volume includes an opening in the floor.

18. The recreational vehicle according to claim 17, further including a third insulating member, a third enclosed volume defined by the floor, the chassis and the third insulating member and an air flow path between the second enclosed volume and the third enclosed volume.

19. The recreational vehicle according to claim 17, wherein the chassis includes a first cross member having an opening therein and the airflow path between the first enclosed volume and the second enclosed volume is defined at least in part by the opening in the first cross member.

20. The recreational vehicle according to claim 19, wherein the chassis includes a second cross member having an opening therein and the airflow path between the second enclosed volume and the third enclosed volume is defined at least in part by the opening in the second cross member.

21. The recreational vehicle according to claim 20, further including a fuel tank located between the first and second cross members.

* * * * *